(12) United States Patent
Michaels et al.

(10) Patent No.: US 7,962,540 B2
(45) Date of Patent: Jun. 14, 2011

(54) MIXED RADIX NUMBER GENERATOR WITH CHOSEN STATISTICAL ARTIFACTS

(75) Inventors: Alan J. Michaels, West Melbourne, FL (US); David B. Chester, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 928 days.

(21) Appl. No.: 11/759,276

(22) Filed: Jun. 7, 2007

(65) Prior Publication Data

US 2008/0307024 A1 Dec. 11, 2008

(51) Int. Cl.
*G06F 7/58* (2006.01)

(52) U.S. Cl. ....................................................... 708/250

(58) Field of Classification Search .................. None
See application file for complete search history.

(56) References Cited

U.S. PATENT DOCUMENTS

| | | |
|---|---|---|
| 3,564,223 A | 2/1971 | Harris et al. |
| 4,646,326 A | 2/1987 | Backof, Jr. et al. |
| 4,703,507 A | 10/1987 | Holden |
| 5,007,087 A | 4/1991 | Bernstein et al. |
| 5,048,086 A | 9/1991 | Bianco et al. |
| 5,077,793 A | 12/1991 | Falk et al. |
| 5,276,633 A | 1/1994 | Fox et al. |
| 5,297,153 A | 3/1994 | Baggen et al. |
| 5,297,206 A | 3/1994 | Orton |
| 5,319,735 A | 6/1994 | Preuss et al. |
| 5,412,687 A | 5/1995 | Sutton et al. |
| 5,598,476 A | 1/1997 | LaBarre et al. |
| 5,757,923 A | 5/1998 | Koopman, Jr. |
| 5,811,998 A | 9/1998 | Lundberg et al. |
| 5,852,630 A | 12/1998 | Langberg et al. |
| 5,900,835 A | 5/1999 | Stein |
| 5,924,980 A | 7/1999 | Coetzee |
| 5,937,000 A | 8/1999 | Lee et al. |
| 6,014,446 A | 1/2000 | Finkelstein |
| 6,023,612 A | 2/2000 | Harris et al. |
| 6,038,317 A | 3/2000 | Magliveras et al. |

(Continued)

FOREIGN PATENT DOCUMENTS

EP 0 849 664 A2 6/1998

(Continued)

OTHER PUBLICATIONS

U.S. Appl. No. 11/759,277, Michaels, Alan J.

(Continued)

*Primary Examiner* — David H Malzahn
(74) *Attorney, Agent, or Firm* — Fox Rothschild, LLP; Robert J. Sacco

(57) ABSTRACT

A method is provided for masking a process used in generating a number sequence. The method includes generating a first sequence of numbers contained within a Galois field GF[M]. The method also includes performing a first modification to a first number in the first sequence of numbers. The first modification includes summing the first number with a result of a modulo P operation performed on a second number of the first sequence that proceeds the first number. M is relatively prime with respect to P. The method further includes performing a second modification to the first random number. The second modification is comprised of a modulo P operation. This second modification is performed subsequent to the first modification. The method includes repeating the first and second modification for a plurality of numbers comprising the first sequence of numbers to generate a second sequence of numbers.

26 Claims, 9 Drawing Sheets

U.S. PATENT DOCUMENTS

| | | | |
|---|---|---|---|
| 6,078,611 | A | 6/2000 | La Rosa et al. |
| 6,304,216 | B1 | 10/2001 | Gronemeyer |
| 6,331,974 | B1 | 12/2001 | Yang et al. |
| 6,377,782 | B1 | 4/2002 | Bishop et al. |
| 6,570,909 | B1 | 5/2003 | Kansakoski et al. |
| 6,614,914 | B1 | 9/2003 | Rhoads et al. |
| 6,744,893 | B1 | 6/2004 | Fleming-Dahl |
| 6,754,251 | B1 | 6/2004 | Sriram et al. |
| 6,766,345 | B2 | 7/2004 | Stein et al. |
| 6,842,479 | B2 | 1/2005 | Bottomley |
| 6,980,656 | B1 | 12/2005 | Hinton, Sr. et al. |
| 6,986,054 | B2 | 1/2006 | Kaminaga et al. |
| 7,023,323 | B1 | 4/2006 | Nysen |
| 7,027,598 | B1 | 4/2006 | Stojancic et al. |
| 7,069,492 | B2 | 6/2006 | Piret et al. |
| 7,076,065 | B2 | 7/2006 | Sherman et al. |
| 7,078,981 | B2 | 7/2006 | Farag |
| 7,079,651 | B2 | 7/2006 | Den Boer et al. |
| 7,095,778 | B2 | 8/2006 | Okubo et al. |
| 7,133,522 | B2 | 11/2006 | Lambert |
| 7,170,997 | B2 | 1/2007 | Petersen et al. |
| 7,190,681 | B1 | 3/2007 | Wu |
| 7,200,225 | B1 | 4/2007 | Schroeppel |
| 7,233,969 | B2 | 6/2007 | Rawlins et al. |
| 7,233,970 | B2 | 6/2007 | North et al. |
| 7,245,723 | B2 | 7/2007 | Hinton, Sr. et al. |
| 7,269,198 | B1 | 9/2007 | Elliott et al. |
| 7,269,258 | B2 | 9/2007 | Ishihara et al. |
| 7,272,168 | B2 | 9/2007 | Akopian |
| 7,277,540 | B1 | 10/2007 | Shiba et al. |
| 7,529,292 | B2 | 5/2009 | Bultan et al. |
| 7,643,537 | B1 | 1/2010 | Giallorenzi et al. |
| 7,779,060 | B2 | 8/2010 | Kocarev et al. |
| 7,830,214 | B2 | 11/2010 | Han et al. |
| 7,853,014 | B2 | 12/2010 | Blakley et al. |
| 2002/0099746 | A1 | 7/2002 | Tie et al. |
| 2003/0044004 | A1 | 3/2003 | Blakley et al. |
| 2004/0001556 | A1 | 1/2004 | Harrison et al. |
| 2004/0059767 | A1 | 3/2004 | Liardet |
| 2004/0196212 | A1 | 10/2004 | Shimizu |
| 2005/0031120 | A1 | 2/2005 | Samid |
| 2005/0050121 | A1 | 3/2005 | Klein et al. |
| 2005/0089169 | A1 | 4/2005 | Kim et al. |
| 2005/0207574 | A1 | 9/2005 | Pitz et al. |
| 2005/0274807 | A1 | 12/2005 | Barrus et al. |
| 2006/0072754 | A1 | 4/2006 | Hinton et al. |
| 2006/0123325 | A1 | 6/2006 | Wilson et al. |
| 2006/0209932 | A1 | 9/2006 | Khandekar et al. |
| 2006/0251250 | A1 | 11/2006 | Ruggiero et al. |
| 2007/0121945 | A1 | 5/2007 | Han et al. |
| 2007/0230701 | A1 | 10/2007 | Park et al. |
| 2008/0008320 | A1 | 1/2008 | Hinton et al. |
| 2008/0016431 | A1 | 1/2008 | Lablans |
| 2008/0095215 | A1 | 4/2008 | McDermott et al. |
| 2008/0198832 | A1 | 8/2008 | Chester |
| 2008/0263119 | A1 | 10/2008 | Chester et al. |
| 2008/0294710 | A1 | 11/2008 | Michaels |
| 2008/0294956 | A1 | 11/2008 | Chester et al. |
| 2008/0304553 | A1 | 12/2008 | Zhao et al. |
| 2008/0304666 | A1 | 12/2008 | Chester et al. |
| 2008/0307022 | A1 | 12/2008 | Michaels et al. |
| 2008/0307024 | A1 | 12/2008 | Michaels et al. |
| 2009/0034727 | A1 | 2/2009 | Chester et al. |
| 2009/0044080 | A1 | 2/2009 | Michaels et al. |
| 2009/0110197 | A1 | 4/2009 | Michaels |
| 2009/0122926 | A1 | 5/2009 | Azenkot et al. |
| 2009/0196420 | A1 | 8/2009 | Chester et al. |
| 2009/0202067 | A1 | 8/2009 | Michaels et al. |
| 2009/0245327 | A1 | 10/2009 | Michaels |
| 2009/0279688 | A1 | 11/2009 | Michaels et al. |
| 2009/0279690 | A1* | 11/2009 | Michaels et al. ............... 380/28 |
| 2009/0296860 | A1 | 12/2009 | Chester et al. |
| 2009/0300088 | A1 | 12/2009 | Michaels et al. |
| 2009/0309984 | A1 | 12/2009 | Bourgain et al. |
| 2009/0310650 | A1 | 12/2009 | Chester et al. |
| 2009/0323766 | A1 | 12/2009 | Wang et al. |
| 2009/0327387 | A1 | 12/2009 | Michaels et al. |
| 2010/0111296 | A1 | 5/2010 | Brown et al. |

FOREIGN PATENT DOCUMENTS

| | | |
|---|---|---|
| EP | 0 949 563 | 10/1999 |
| EP | 2 000 900 | 12/2008 |
| EP | 2 000 902 A2 | 12/2008 |
| GB | 1167272 A | 10/1969 |
| WO | WO-0135572 A2 | 5/2001 |
| WO | WO-2006 110954 | 10/2006 |
| WO | WO 2008 065191 | 6/2008 |
| WO | WO-2008099367 A2 | 8/2008 |
| WO | WO-2008130973 A1 | 10/2008 |
| WO | WO 2009 143283 | 12/2009 |

OTHER PUBLICATIONS

Deckert, T., et al: "Throughput of WLAN with TDMA and Superimposed Transmission with Resource and Traffic Constraints" Personal, Indoor and Mobile Radio Communications, 2006 IEEE 17th Inter National Symposium on, IEEE, PI, Sep. 1, 2006, pp. 1-5, XP031023581, ISBN: 978-1-4244-0329-5.

Deckert, T., et al: 1-10 "Superposed Signaling Option for Bandwidth Efficient Wireless LANs" Proceedings of the 7th International Symposium on Wireless Personal Multimedia Communications, [Online] Sep. 15, 2004, XPOO2558039.

Manikandan, et al, "A Novel Pulse Based Ultrawide Band System Using Chaotic Spreading Sequences" Communication Systems Software and Middleware, 2007. Comsware 2007. 2nd International Conference on, IEEE, PI, Jan. 1, 2007, pp. 1-5, XP031113946 ISBN: 978-1-4244-0613-5; p. 1, p. 5.

Nakamura, et al, "Chaotic synchronization-based communications using constant envelope pulse" Electrical Engineering in Japan, [Online] vol. 163, No. 3, Feb. 12, 2008, pp. 47-56, XP002539977 Japan. Retrieved from the Internet: URL:http://www3.interscience.wiley.com/cgi-bin/fulltext/117910986/PDFSTART>; [retrieved on Aug. 4, 2004] p. 47-p. 48; p. 50-p. 51.

Salberg, et al, "Stochastic multipulse-PAM: A subspace modulation technique with diversity" Signal Processing, Elsevier Science Publishers B.V. Amsterdam, NL, vol. 83, No. 12, Dec. 1, 2003, pp. 2559-2577, XP004467986; ISSN: 0165-1684.

Abel, et al., "Chaos Communications-Principles, Schemes, and System Analysis" Proceedings for the IEEE, IEEE. New York, NY. vol. 90, No. 5, May 1, 2002, XP011064997, ISSN: 0018-9219.

Chren, W A: "PN Code Generator with Low Delay-power Product for Spread-Spectrum Communication Systems" IEEE Transactions on Circuits and Systems II: Express Briefs, IEEE Service Center, New York, NY US, vol. 46, No. 12, Dec. 1, 1999, pp. 1506-1511, XP000932002, ISSN: 1057-7130.

De Matteis, A., et al., "Pseudorandom Permutation". Journal of Computational and Applied Mathematics, Elsevier, Netherlands, vol. 142, No. 2, May 15, 2002, pp. 367-375, XP007906923, ISSN: 0377-0427.

Knuth, D E: "The Art of Computer Programming, 3.2.2 Other Methods" The Art of Computer Programming. vol. 2: Seminumerical Algorithms, Boston, MA: Addison-Wesley, US, Jan. 1, 1998, pp. 26-40, XP002409615, ISBN: 978-0-0201-89684-8.

Knuth, D.E., "The Art of Computer Programming, Third Edition; vol. 2 Seminumerical Algorithms". Feb. 2005, Addison-Wesley, Boston 310200, XP002511903, pp. 142-146, 284-292.

Kolumban, et al., "Chaotic Communications with Correlator Receivers: Theory and Performance Limits" Proceedings of the IEEE, vol. 90, No. 5, May 2002.

Kolumban, et al., "The Role of Synchronization in Digital Communications Using Chaos—Part II: Chaotic Modulation and Chaotic Synchronization", IEEE Transactions on Circuits and Systems Part I: Regular Papers, IEEE Service Center, New York, NY US, vol. 45, No. 11, Nov. 1, 1998, XP011011827, ISSN: 1057-7122.

Leung, et al., "Time-varying synchronization of chaotic systems in the presence of system mismatch" Physical Review E (Statistical, Nonlinear, and Soft Matter Physics) APS through AIP USA, [online] Vo. 69, No. 2, Feb. 1, 2004, pp. 26201-1, XP002499416, ISSN: 1063-651X. Retrieved from the Internet: URL:http://prola.aps.org/pdf/PRE/v69/i2/e026201 [retrieved Oct. 13, 2008].

Morsche, et al., "Signals and Systems," lecture notes, University of Eindhoven, The Netherlands, 1999.

Panella, et al., "An RNS Architecture for Quasi-Chaotic Oscillators" The Journal of VLSI Signal Processing, Kluwer Academic Publishes, BO, vol. 33, No. 1-2, Jan. 1, 2003, pp. 199-220, XP019216547, ISSN: 1573-109X.

Pleszczynski, S, "On the Generation of Permutations" Information Processing Letters, Amsterdam, NL, vol. 3, No. 6, Jul. 1, 1975, pp. 180-183, XP008023810, ISSN: 0020-0190.

Pourbigharaz F. et al, Modulo-Free Architecture for Binary to Residue Transformation with Respect to (2m-1, 2m, 2m+1) Moduli Set, IEEE International Symposium on Circuits and Systems, May 30-Jun. 2, 1994, pp. 317-320, vol. 2, London, UK.

Vanwiggeren et al., "Chaotic Communication Using Time-Delayed Optical Systems", International Journal of Bifurcation and Chaos, vol. 9, No. 11 (1999), pp. 2129-2156, World Scientific Publishing Company.

Yen, et al., (1999) "Residual Number System Assisted CDMA: A New System Concept", In: ACTS'99, Jun. 8-11, 1999, Sorrento, Italy.

Yu, et al., "A comparative Study of Different Chaos Based Spread Spectrum Communication Systems", ISCAS 2001, Proceedings of the 2001 IEEE International Symposium on Circuits and Systems, Sydney, Australia, May 6-9, 2001; (IEEE International Symposium on Circuits and Systems], New York, NY : IEEE, US, vol. 3, May 6, 2001, pp. 216-216, XP010541114, ISBN: 978-0-7803-6685-5.

Michaels, et al., U.S. Appl. No. 12/056,024, filed Mar. 26, 2008, entitled "Selective Noise Cancellation Of A Spread Spectrum Signal".

Michaels, et al., U.S. Appl. No. 12/117,086, filed May 8, 2008, Entitled "Cryptographic System Including a Mixed Radix Number Generator With Chosen Statistical Artifacts".

Chester, et al., U.S. Appl. No. 12/116,104, filed May 6, 2008, Entitled, "A Closed Galois Field Cryptographic System".

Chester, et al., U.S. Appl. No. 12/131,386, filed Jun. 2, 2008, Entitled "Adaptive Correlation".

Chester, et al., U.S. Appl. No. 12/137,593, filed Jun. 12, 2008, entitled "Featureless Coherent Chaotic Amplitude Modulation".

Michaels, et al., U.S. Appl. No. 12/129,197, filed May 29, 2008, entitled "Digital Generation of an Accelerated or Decelerated Chaotic Numerical Sequence".

Michaels, et al., U.S. Appl. No. 12/129,654, filed May 29, 2008, entitled "Sine/Cosine Generator".

Michaels, et al., U.S. Appl. No. 12/496,214, filed Jul. 1, 2009, entitled "Anti-Jam Communications Having Selectively Variable PAPR Including CAZAC Waveform".

Michaels, et al., U.S. Appl. No. 12/507,111, filed Jul. 22, 2009, entitled "Anti-Jam Communications Using Adaptive Chaotic Spread Waveform".

Chester, et al., U.S. Appl. No. 12/480,264, filed Jun. 8, 2009, entitled "Continuous Time Chaos Dithering".

Chester, et al., U.S. Appl. No. 12/481,704, filed 6/10/09, entitled "Discrete Time Chaos Dithering".

Michaels, et al., U.S. Appl. No. 12/345,163, filed Dec. 29, 2008, entitled "Communications System Employing Chaotic Spreading Codes With Static Offsets".

Micheals, et al., U.S. Appl. No. 12/344,962, filed Dec. 29, 2008, entitled "Communications System Employing Orthogonal Chaotic Spreading Codes".

Michaels, et al., U.S. Appl. No. 12/396,828, filed Jun. 3, 2009, entitled "Communications System Employing Orthogonal Chaotic Spreading Codes".

Michaels, et al., U.S. Appl. No. 12/496,170, filed Jul. 1, 2009, entitled, "Permisiion Based Multiple Access Communications Systems".

Michaels, et al., U.S. Appl. No. 12/496,233, filed Jul. 1, 2009, entitled "Permission-Based Secure Multiple Access Communication Systems Rotations".

Michaels, et al., U.S. Appl. No. 12/507,512, filed Jul. 22, 2009, entitled "Permission-Based TDMA Chaotic Communication Systems".

Micheals, et al., U.S. Appl. No. 12/496,085, filed Jul. 1, 2009, entitled, "High-Speed Cryptographic System Using Chaotic Sequences".

Micheals, et al., U.S. Appl. No. 12/496,123, filed Jul. 1, 2009, entitled, "Rake Receiver for Spread Spectrum Chaotic Communications Systems".

Michaels, et al., U.S. Appl. No. 12/496,146, filed Jul. 1, 2009, entitled "Improved Symbol Estimation for Chaotic Spread Spectrum Signal".

Micheals, et al., U.S. Appl. No. 12/480,316, filed Jun. 8, 2009, entitled "Symbol Duration Dithering for Secured Chaotic Communications".

Michaels, et al., U.S. Appl. No. 12/496,183, filed Jul. 1, 2009, entitled "Bit Error Rate Reduction in Chaotic Communications".

Michaels, Alan, U.S. Appl. No. 12/248,131, filed Oct. 9, 2008, entitled "Ad-Hoc Network Acquisition Using Chaotic Sequence Spread Waveform".

Michaels, Alan, U.S. Appl. No. 12/201,021, filed Aug. 29, 2008, entitled, "Multi-Tier Ad-Hoc Network Communications".

Aparicio; "Communications Systems Based on Chaos" May 2007. Universidad Rey Juan Carlos.

Bererber, S.M., et al., "Design of a CDMA Sysetm in FPGA Technology", Vehicular Technology Conference, 2007. VTC2007-Spring. IEEE 65$^{TH}$ Apr. 22, 2007, Apr. 25, 2007, pp. 3061-3065, XP002575053 Dublin ISNB: 1-4244-0266-2 Retrieved from the Internet: URL:http://ieeexplore.ieee.org> [retrieved on Mar. 23, 2010].

Desoky, A.H., et al., "Cryptography Software System Using Galois Field Arithmetic" 2006 IEEE Information Assurance Workshop, West Point, NY, Jun. 12-13, Piscataway, NJ, USA IEEE, Jan. 1, 2006, pp. 386-387, XP031099891.

El-Khamy S E: "New trends in wireless multimedia communications based on chaos and fractals" National Radio Science Conference, 2004. NRSC 2004. Proceedings of the Twenty-First Cairo, Egypt Mar. 16-18, 2004, Piscataway, NJ, USA, IEEE, Mar. 16, 2004, pp. 1-1 1, XP010715117 ISBN: 978-977-5031-77-8.

Lai, X., et al., "A Proposal for a New Block Encryption Standard" Advances in Cryptology-Eurocrypt '90, Workshop on the Theory and Application of Cryptographic Techniques Proceedings, Springer-Verlag Berlin, Germany, 1998, pp. 389-404, XP000617517.

Soobul, Y., et al. "Digital chaotic coding and modulation in CDMA" IEEE Africon 2002 Oct. 2, 2002 Oct. 4, 2002, pp. 841-846, XP002575052 Retrieved from the Internet: URL:http://ieeexplore.ieee.org> [retrieved on Mar. 23, 2010].

Rabiner, Lawrence R., "A Tutorial on Hidden Markov Models and Selected Applications in Speech Recognition", Proceedings of the IEEE, vol. 77, No. 2, Feb. 1989.

Boyar, "Inferring Sequences Produce by Pseudo-Random Number Generators", Journal of the Associate for Computing Machine, vol. 36, No. 1, pp. 20-41, 1989.

Barile, M., "Bijective", From MathWorld-A Wolfram Web Resource, created by Eric W. Weisstein, [online] [retrieved on Nov. 8, 2010] Retrieved from the Internet: <<http://mathworld.wolfram.com/Bijective.html>>.

Weisstein, E., Surejection:, From MathWorld-AWolfram Web Resource [online] [retrieved on Nov. 8, 2010] Retrieved from the Internet: <<http://mathworld.wolfram.com/surjection.html>>.

Weisstein, E., Injection:, From MathWorld-AWolfram Web Resource [online] [retrieved on Nov. 8, 2010] Retrieved from the Internet: <http://mathworld.wolfram.com/injection.html>>.

Harris Corp., International Search Report mailed Feb. 11, 2010, Application Serial No. PCT/US2009/059948.

Harris Corp., International Search Report mailed Apr. 13, 2010, Application Serial No. PCT/US2009/0069121.

Harris Corp., International Search Report mailed Apr. 13, 2010, Application Serial No. PCT/US2009/0069118.

Harris Corp., European Search Report mailed Mar. 4, 2010, Patent Application No. 08009745.4.

Taylor, F.J., "Residue Arithmetic A Tutorial with Examples", Computer, vol. 17, No. 5, pp. 50-62, May 1984, doi: 10.1109/MC. 1984. 1659138.

* cited by examiner

FIG. 4

```
BEGIN 402
   ↓
SELECT A RELATIVELY LARGE FIRST GALOIS FIELD GF[M] AND A SMALLER SECOND GALOIS FIELD GF[P], WHERE THE GALOIS FIELD CHARACTERISTIC M IS MUTUALLY PRIME WITH RESPECT TO THE GALOIS FIELD CHARACTERISTIC P
404
   ↓
GENERATE A FIRST RANDOM NUMBER SEQUENCE UTILIZING A RING STRUCTURE DEFINED BY A PERIODIC MAPPING ON THE RELATIVELY LARGE GALOIS FIELD GF[M]
406
   ↓
PERFORM ARITHMETIC OPERATIONS TO GENERATE MODIFIED RANDOM NUMBERS BY COMBINING EACH RANDOM NUMBER OF THE FIRST RANDOM NUMBER SEQUENCE WITH A RESULT OF A MODULO P OPERATION UTILIZING A PRECEDING RANDOM NUMBER SECTION OF THE FIRST RANDOM NUMBER SEQUENCE
408
   ↓
PERFORM ARITHMETIC OPERATIONS TO GENERATE A SECOND RANDOM NUMBER SEQUENCE UTILIZING THE MODIFIED RANDOM NUMBERS DERIVED FROM THE ARITHMETIC OPERATIONS PERFORMED IN STEP 208, WHEREIN THE SECOND RANDOM NUMBER SEQUENCE HAS EVENLY DISTRIBUTED STATISTICAL ARTIFACTS OVER ALL EQUIVALENCE CLASSES OF THE SECOND GALOIS FIELD GF[P]
410
   ↓
END 412
```

400

MIXED RADIX NUMBER GENERATOR WITH CHOSEN STATISTICAL ARTIFACTS

BACKGROUND OF THE INVENTION

1. Statement of the Technical Field

The inventive arrangements relate to communications systems employing mixed radix conversion. More particularly, the inventive arrangements relate to a method and system for performing a mixed radix ring generation and conversion to produce a random number sequence with chosen statistical characteristics over all equivalence classes of a chosen Galois field GF[P].

2. Description of the Related Art

Communication systems can include ring generators in numerous applications. A ring generator is a simple structure over a finite field that exhaustively produces possible outputs through repeated mapping. The mapping is some combination of an additive and a multiplicative mapping; with irreducible polynomials being ideal. For example, a ring generator includes repeated computations of an irreducible polynomial $f(x)=3x^3+3x^2+x$ on a finite Galois field GF[11] containing eleven (11) elements. A finite or Galois field GF[P] is a field that contains only a finite number of elements $\{0, 1, 2 \ldots P-1\}$. The finite or Galois field GF[P] has a finite field size defined by the Galois characteristic P, which is often chosen to be a prime number based on number theoretical consequences. The computations ere typically implemented in digital hardware as lookup table operations, feedback loops, or multiplier structures.

Despite the advantages of such a ring generator, it suffers from certain drawbacks. For example, if the ring generator's Galois characteristic P is chosen to be a prime number (not equal to two), then computation is typically inefficient in a digital (binary) domain. Also, lookup table operations performed in the finite or Galois field GF[P] are memory intensive if the Galois characteristic P is large. Moreover, the ring generator's output values are highly deterministic. As such, knowledge of a mapping and current finite field conditions gives complete knowledge of an output sequence.

One method to mask the output sequence of a ring generator from unintended re-construction is to combine two or more ring generators via algorithms that perform bijective mappings into a larger effective domain. An example of this combination is through the Chinese Remainder Theorem (CRT) when the Galois characteristics of the individual ring generators are mutually prime. Another method is to simply truncate the ring generator output value by performing a mixed-radix conversion from a domain GF[P] to a binary domain $GF[2^k]$. Both of these masking methods partially mask the original sequence, yet they still present statistical artifacts that may be used to re-engineer the sequence values. In cryptology, such an attempt is often called a frequency attack, whereby an individual can obtain partial information of the pseudo-random sequence's mapping and state characteristics through statistical analysis. A common layman's example of this process is the word puzzles that exchange one letter for another. Knowledge of the English language gives partial knowledge that E's are more prevalent than Z's. In effect, the search is reduced from brute force to a more logical one.

In view of the forgoing, there remains a need for a mixed-radix conversion method that is computationally efficient in a digital (binary) domain and does not have any gross statistical artifacts. There is also a need for a ring generator having an implementation that is less hardware intensive than conventional ring generator implementations and yield a pseudo-random number sequence that has chosen statistical characteristics. There is further a need for a ring generator having orbits that appear non-deterministic.

SUMMARY OF THE INVENTION

The invention concerns a method for masking a process used in generating a number sequence. The method includes a generating step, a first modification step, and a second modification step. The generating step involves generating a first sequence of numbers contained within a Galois field, GF[M]. The first modification step involves performing a first modification to a first number in the first sequence of numbers. The first modification is achieved by summing the first number with a result of a modulo P operation performed on a second number of the first sequence that proceeds the first number. M is relatively prime with respect to P. The second modification step involves performing a second modification to the first random number. The second modification is comprised of a modulo P operation. The second modification is performed subsequent to the first modification. The method further includes repeating the first and second modification for one or more numbers comprising the first sequence of numbers to generate a second sequence of numbers.

According to an aspect of the invention, the method includes modifying a digital data stream with the second sequence of numbers. The generating step also includes generating a pseudo-random sequence of numbers containing chosen statistical artifacts relating to the generating step. The statistical artifacts are typically chosen to create a uniformly distributed sequence of random numbers on GF[P] by the first and second modification steps. As used herein, a "uniformly distributed sequence of random numbers" is one where each numerical value in a sequence approximates a random draw from a perfect uniform distribution, where all elements in the protection space are equally likely to be drawn. The generating step further includes exhaustively producing the first sequence of numbers by using a mapping which is periodically repeated. The mapping is selected to include a combination of an additive mapping and a multiplicative mapping. The additive mapping and multiplicative mapping are selected in combination to include repeated computations of an irreducible polynomial over a Galois field, GF[M].

According to another aspect of the invention, the method includes selecting a value of M that is larger than P. The method also includes selecting a value of M that is mutually prime with P and all of a plurality of prime factors of P including $p_1, p_2, p_3, \ldots p_k$. The method further includes performing a third modification step on the second sequence of numbers. The third modification step involves generating one or more output number sequences from the second sequence of numbers. The third modification step also involves a modulo p operation performed upon each number in the second sequence of numbers to generate the output number sequences, p includes a plurality of values selected from the group comprising $p_1, p_2, p_3, \ldots p_k$.

According to yet another embodiment of the invention, the second number is immediately preceding the first number. The second number precedes the first number by n positions, n is greater than one (1). The second sequence of numbers has statistical artifacts that are evenly distributed over two (2) or more equivalence classes of the Galois field GF[P]. The equivalence classes include an equivalence class for each integer $0, 1, \ldots, P-1$.

A mixed radix number generator is also provided. The mixed radix number generator includes a number generator and a mixed radix accumulator. The number generator is configured to generate a first sequence of numbers contained within a Galois field GF[M]. The mixed radix accumulator is configured to perform a first modification to a first number in the first sequence of numbers. The first modification is achieved by summing the first number with a result of a modulo P operation performed on a second number of the first sequence that proceeds the first number. M is relatively prime with respect to P. The mixed radix accumulator is also configured to perform a second modification to the first random number. The second modification is comprised of a modulo P operation. The second modification is performed subsequent to the first modification. The mixed radix accumulator is further configured to repeat the first and second modifications for a plurality of numbers comprising the first sequence of numbers to generate a second sequence of numbers.

According to an aspect of the invention, the mixed radix number generator includes a means configured to use the second sequence of numbers to modify a digital data stream. The number generator is comprised of a pseudo-random number generator. The pseudo-random number generator generates a pseudo-random sequence of numbers containing statistical artifacts relating to the generation of the first sequence of numbers. The statistical artifact is eliminated by the mixed radix accumulator. The number generator is also configured to exhaustively produce the first sequence of numbers by using a mapping which is periodically repeated. The mapping includes a combination of an additive mapping and a multiplicative mapping. The additive mapping and multiplicative mapping in combination include repealed computations of an irreducible polynomial over a Galois field GF[M]. M is larger than P. The value of M is mutually prime with respect to a value of P and all of a plurality of prime factors of P including $p_1, p_2, p_3, \ldots p_k$.

According to another aspect of the invention, the mixed radix number generator is comprised of one or more arithmetic operator units. Each of the arithmetic operator units is configured to perform a third modification on the second sequence of numbers. The arithmetic operator units are configured to generate one or more output number sequences from the second sequence of numbers. The third modification includes a modulo p operation performed upon each number in the second sequence of numbers to generate the output number sequences, p includes a plurality of values selected from the group comprising $p_1, p_2, p_3, \ldots p_k$.

The second number precedes the first number by n positions, n is greater than one (1). The first sequence of numbers is limited to a finite number of elements M defined by a Galois field GF[M]. According to another aspect of the invention, the second number precedes the first number by one (1) position. The second sequence of numbers has statistical artifacts that are evenly distributed over two (2) or more equivalence classes of the Galois field GF[P]. The equivalence classes include an equivalence class for each integer 0, 1, ..., P−1.

According to yet another aspect of the invention, the first number sequence is operated by a filter structure whose calculations are performed inside a Galois field of equal size to the second number sequence. The result of this filter is presented for combination with a subsequent value in the first number sequence. As used herein, a "filter" means a mathematical structure having an output that is a time weighted sum of a previous succession of inputs.

BRIEF DESCRIPTION OF THE DRAWINGS

Embodiments will be described with reference to the following drawings figures, in which like numerals represent like items throughout the figures, and in which:

FIG. 38 is a graph showing statistical simulations of a mixed radix number generator method that is useful for understanding the invention.

FIG. 4 is a flow diagram of a mixed radix number generator method for spreading statistical artifacts evenly over all equivalence classes of a Galois field GF[P].

DETAILED DESCRIPTION OF THE PREFERRED EMBODIMENTS

Figure 1:
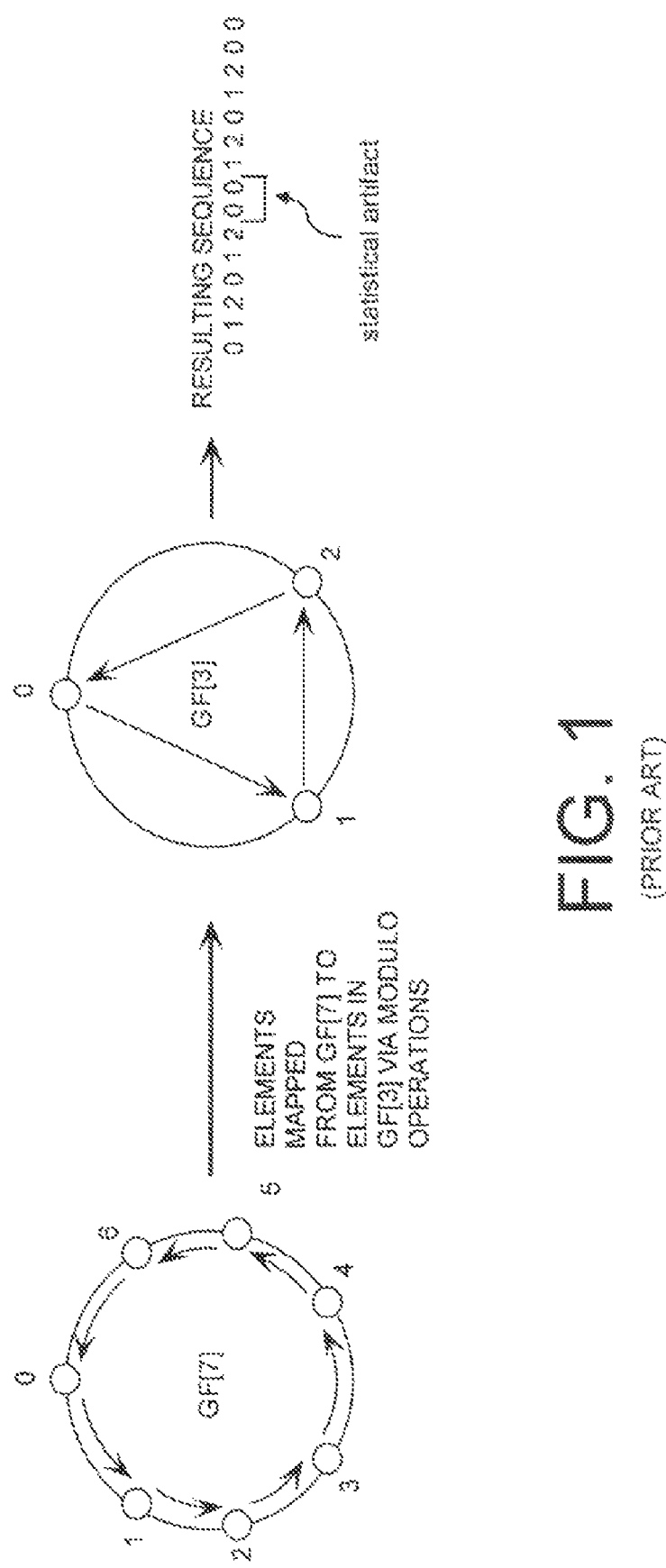
FIG. 1 is a conceptual diagram of a conventional mixed radix conversion algorithm that is useful for understanding the invention.

Referring now to FIG. 1, there is provided a conceptual diagram of a conventional mixed radix conversion algorithm that is useful for understanding the invention. In communications systems, various algorithms are employed for combining a number sequence with a data stream. This combining process can be performed for encrypting or masking the data stream prior to its transmission over a communications link. Such algorithms can include residue number system (RNS) operations for expressing each number of the number sequence in a Galois field GF[M] base. The finite or Galois field GF[M] has a finite field size defined by the Galois characteristic M. A Galois field GF[M] is a field that contains only a finite number of elements {0, 1, 2, ... M−1}. As such, all arithmetic operations performed in the finite or Galois field result in an element within that field. As such, a resulting sequence of a Galois field GF[M] operation can repeat every $(M+1)^{th}$ element. These RNS operations are well known to persons skilled in the art, and therefore will not be described in great detail herein. However, it should be understood that these RNS operations can require a mixed radix conversion. The phrase "mixed radix conversion" as used herein refers to a conversion of a number sequence from a first number base (or radix) to a second number base (or radix). For example, a number sequence expressed in a Galois field GF[7] base is converted to a number sequence expressed in a Galois field GF[3] base as depicted in FIG. 1. Typically, mixed-radix conversion produces statistical artifacts whenever the destination radix is smaller than and does not evenly divide the starting radix.

A mixed radix conversion algorithm can include computations based on the Chinese Remainder Theorem. The Chinese Remainder Theorem is well known to persons skilled in the art and therefore will not be described in great detail herein. However, if should be understood that these computations are performed to uniquely combine numbers expressed in multiple small number bases (or radices). This combination is often achieved via a mapping operation. The mapping operation of the Chinese Remainder Theorem involves mapping each of the numbers expressed in a small number base (or radices) to numbers expressed in a large number base.

Notably, there is a statistical non-uniformity in the statistical distribution resulting from a number sequence conversion from a first Galois field $GF[M_1]$ base to a second Galois field $GF[M_2]$ base when the two (2) number bases are not evenly divisible. For example, a random number sequence expressed in a Galois field GF[7] base is mapped to a number sequence expressed in a Galois field GF[3] base. The random number sequence expressed in a Galois field GF[7] base is defined by the set of elements $\{0, 1, 2, \ldots, 6\}$. Similarly, the number sequence expressed in a Galois field GF[3] base is defined by the set of elements $\{0, 1, 2\}$. Mapping the number sequence expressed in a Galois field GF[7] base to a number sequence expressed in the Galois field GF[3] base generally involves segmenting each element $\{G< 1, 2, \ldots, 6\}$ by their corresponding equivalence class modulo three (3). Since the Galois field GF[3] is a finite field that contains only a finite number of elements $\{0, 1, 2\}$, there is a corresponding equivalence class for the integers zero (0), one (1), and two (2).

The mapping operations of the elements from the Galois field GF[7] to elements in a Galois field GF[3] are listed in the following Table (1).

TABLE 1

| Elements From A Galois Field GF[7]: | Mapping Operations: | Equivalent Elements in A Galois Field GF[3]: |
|---|---|---|
| 0 | 0 modulo 3 | 0 |
| 1 | 1 modulo 3 | 1 |
| 2 | 2 modulo 3 | 2 |
| 3 | 3 modulo 3 | 0 |
| 4 | 4 modulo 3 | 1 |
| 5 | 5 modulo 3 | 2 |
| 6 | 6 modulo 3 | 0 |

As illustrated in Table 1, the mapping operations result in a non-uniform distribution of the elements over the Galois field GF[3]. Specifically, the resulting sequence of the mapping operations is defined as $\{0\ 1\ 2\ 0\ 1\ 2\ 0\}$. There are three elements $\{0, 3, 8\}$ from the Galois field GF[7] in an equivalence class for the integer zero (0). There are two (2) elements $\{1, 4\}$ from the Galois field GF[7] in an equivalence class for the integer one (1). There are two (2) elements $\{2, 5\}$ from the Galois field GF[7] In an equivalence class for the integer two (2).

By utilizing a statistical analysis, an outside party can gain partial information from a system implementing the conventional mixed radix conversion algorithm (described above in relation to FIG. 1) and can more easily identify an original number sequence from a data stream altered by a resulting number sequence of the mapping operations. For example, if one knows the sizes of the two (2) number bases, then the attacker oar) use the statistical proportion of elements in the various equivalence classes to more easily identify the original number sequence from the altered data stream. Moreover, knowledge of the data message format will coincide in a statistically significant fashion with the statistical artifacts of the random number sequence. In effect, more information is provided in the data message content. As used herein, the term "statistically significant" refers to a mathematical assurance of the validity of some piece of information. As such, it is desirable to remove statistical artifacts from results derived by a mixed radix conversion algorithm so that identifying an original number sequence from an altered data stream is relatively difficult.

Accordingly, some embodiments of the present invention provide a method for removing unwanted statistical artifacts in a mixed radix conversion. One method generally includes spreading statistical artifacts evenly over all equivalence classes of a Galois field GF[P]. This even distribution of statistical artifacts can be accomplished by using a mixed-radix ring generator process. The process involves (1) generating a first random number sequence utilizing a ring structure defined by a Galois field GF[M], (2) modifying each random number of the first random number sequence by adding a previously computed remainder via a modulo P operation, and (3) generating a second random number sequence utilizing the modified random numbers. The second random number sequence is also generated utilizing a modulo P operation. The second random number sequence includes statistical artifacts that are distributed evenly over-all equivalence classes of the Galois field GF[P].

It should be understood that such a mixed radix number generator process provides stochastic adherence to desired statistical properties rather than unconditional adherence to desired statistical properties. The phrase "stochastic adherence" refers to a behavior that converges to an ideal. The phrase "unconditional adherence" refers to a level of assurance provide by mathematical proof. It should also be understood that such a mixed radix number generator process can be used in a variety of communications system applications. For example, such a mixed radix number generator process can be implemented in a cryptographic system for altering a data stream. In such a scenario, the mixed radix number generator process provides an increased security feature to the cryptographic system. It should be noted that this mixed radix number generator process produces a random number sequence that appears to be highly non-deterministic in nature, in performing the modulo reduction, information from the original number sequence is intentionally destroyed, in effect unintended reconstruction is made more difficult.

The present invention will now be described more fully hereinafter with reference to accompanying drawings, in which illustrative embodiments of the invention are shown. However, this invention may be embodied in many different forms and should not be construed as limited to the embodiments set forth herein. For example, the present invention can be embodied as a method, a data processing system, or a computer program product. Accordingly, the present invention can take the form as an entirely hardware embodiment, an entirely software embodiment, or a hardware/software embodiment.

Figure 2:
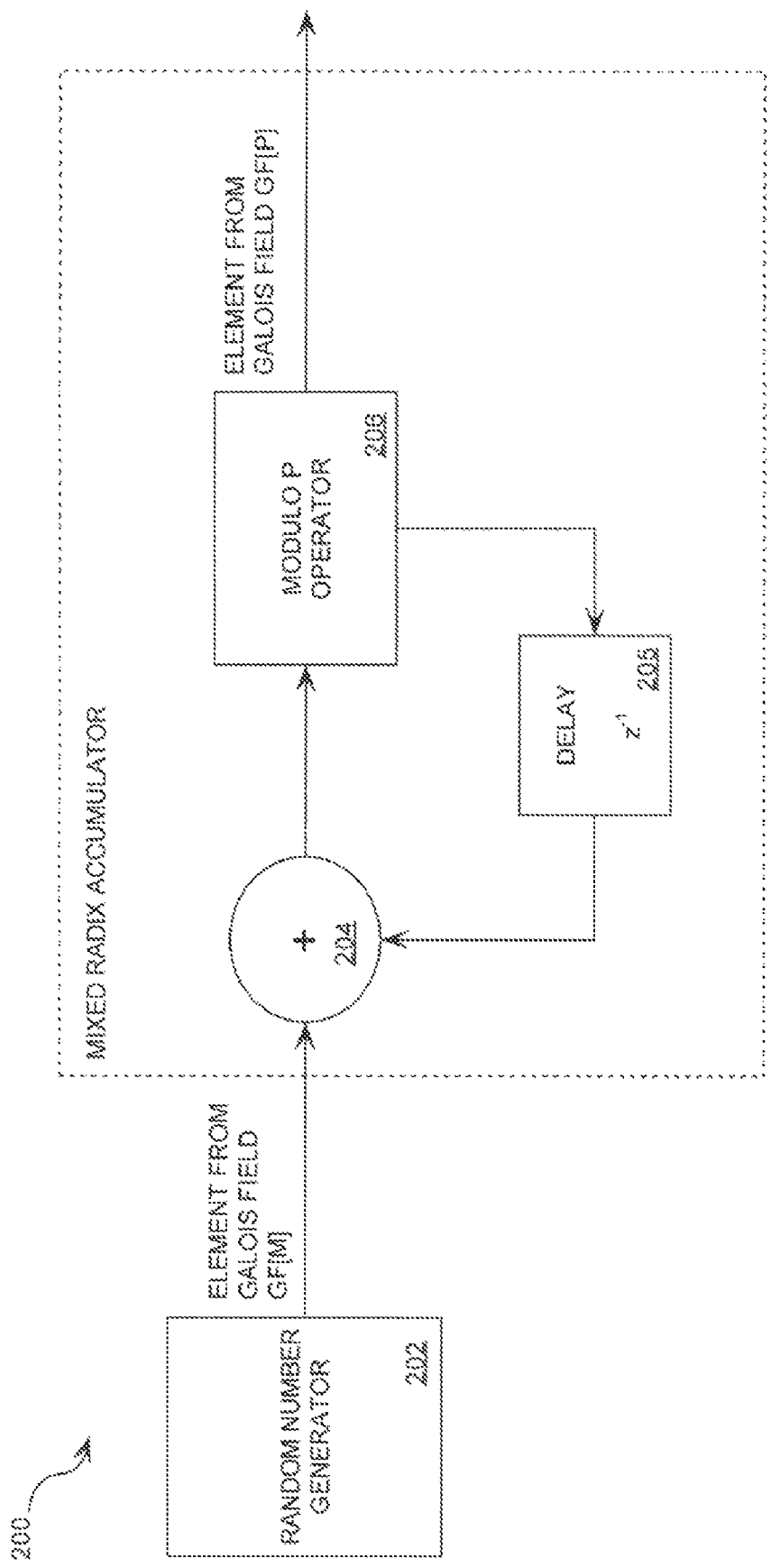
FIG. 2 is a conceptual diagram of a mixed radix ring generator for spreading statistical artifacts evenly over all equivalence classes of a Galois field GF[P].

Referring now to FIG. 2, there is provided a conceptual diagram of a mixed radix number generator structure which is useful for spreading statistical artifacts evenly over all equivalence classes of a Galois field GF[P]. As shown in FIG. 2, the mixed radix ring generator process begins with the generation of random number sequence in random number generator 202. The random number sequence can be, but is not limited to, a pseudo-random number sequence or a pseudo-chaotic sequence generated on a Galois field of characteristic M. Such a sequence is most easily viewed as a sequence of random elements chosen from a Galois field GF[M], in order to map an element from the Galois field GF[M] to a desired Galois field of characteristic P, the Galois field characteristic M is selected to be relatively prime to the Galois field characteristic P. The phrase "relatively prime" as used herein refers to a collection of numbers having a greatest common divisor of one (1).

The random number sequence is communicated to an adder 204. To negate the statistical anomalies described above (in relation to FIG. 1), a previous output of a modulo P operation is added to a next input from a Galois field GF[M] via a feedback structure. The feedback structure includes a delay unit 205. A result from the adding operation is then communicated to the modulo P operator 208. The module P operator 206 performs a modulo P operation on the result from the adding operation to generate an output value. The output of the modulo P operator is then used as the next addition input effectively rotating the entire ring structure of GF[M]. In effect, the cumulative statistical deviation becomes significantly less noticeable since the rotation will converge to a steady-state value, it is easy to show statistically, that faking numerous such samples from a Galois field GF[P] will distribute the statistical anomalies over all the equivalence classes evenly, returning the output distribution to that of a uniform distribution. An additional option is to induce a constant rotation in addition to that of the feedback path (ideally a value that is less than P and mutually prime with {M, P}) to ensure that there are no fixed points in the conversion. In mathematical parlance, a "fixed point" is one that remains the same both at the input and the output of a mathematical operator, making repeated applications of the operator result in a fixed value. For example, zero (0) is a fixed point of the traditional multiplication operator, since every number times zero (0) is zero (0).

A few numerical examples may help in seeing how the conversion works.

EXAMPLE 1

Let M=5*7=35, p=3, and an initial condition value of the unit delay be zero (0). It should be noted that the initial condition (initial output value) of the unit delay can alternatively be any of zero (0), one (1), or two (2). Note that, absent the feedback mechanism described above, the outputs of the modulo P operation is a stream of values that have a statistical artifact within a Galois field GF[P]. If the distribution of the outputs of the random number generation are truly uniform, then the first two (2) equivalence classes of the Galois filed GF[P] will be larger by one (1) element than the third ($3^{rd}$) equivalence class. This is easily seen from the computation of 35 modulo 3=(3*11+2) modulo 3=2 modulo 3. The feedback (i.e., delay) in FIG. 2 spreads this statistical non-uniformity in the Galois field GF[P] about all three (3) of its equivalence classes.

If the outputs of a first random number generation is a stream defined as {23 8 19 31 0 6 13 21 21 . . . }, then the corresponding output of a modulo three (3) operation without feedback would be [2 2 1 1 0 0 1 0 0 . . . ]. Note that multiple inputs in this case map to the same output, which makes the reverse mapping more difficult. The output of the modulo three (3) operation with unit delay feedback as shown in FIG. 2 is {2 1 2 0 0 0 1 1 1 . . . }. The difference of numbers on this small scale may appear negligible, yet the feedback is spreading the non-uniformity of the mixed-radix conversion about the equivalence classes of GF[P].

Figure 3A:
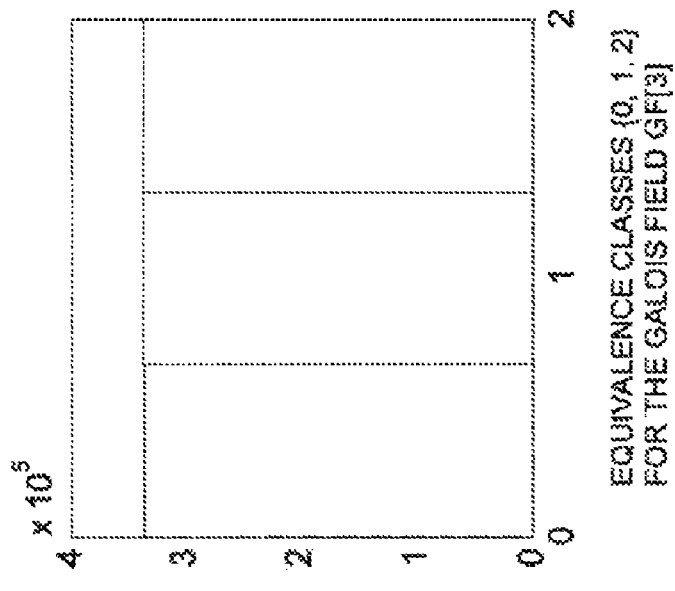
FIG. 3A is a graph showing statistical simulations of a conventional mixed radix conversion algorithm that is useful for understanding the invention.
Figure 3B:
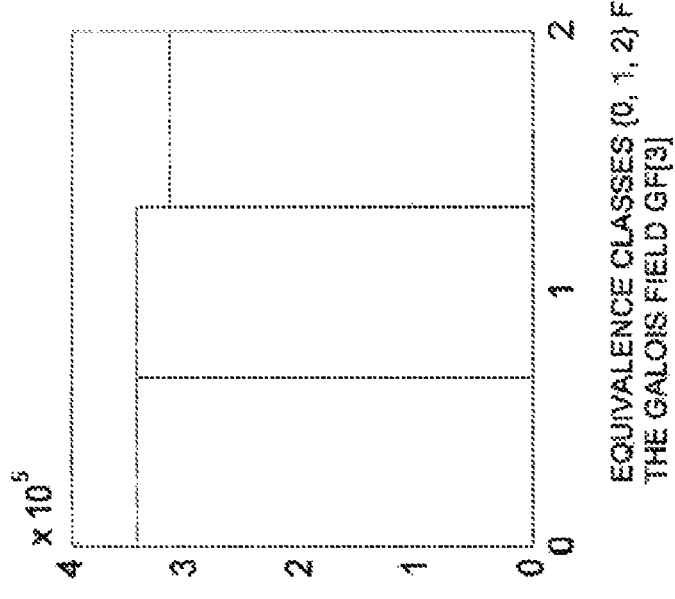

In order to fully appreciate the non-uniformity which can exist with more conventional systems, and the improvement obtained with the arrangement described in FIG. 2, consider a scenario in which the random number generator 202 in FIG. 2 generates 1,000,000 randomly chosen outputs of GF[M]. The Galois field GF[P] is selected to be a Galois field GF[3]. The first random number sequence is comprised of one million (1,000,000) randomly drawn elements from the Galois field GF[M]. If the conventional mixed radix conversion algorithm (described above in relation to FIG. 1) is employed, then the mapping operations result in a non-uniform distribution of the elements over the Galois field GF[3]. A graph is provided in FIG. 3A that illustrates the results of these mapping operations as obtained from a MATLAB® simulation. MATLAB® is a common numerical simulation and analysis tool. The graph shows that the elements 0 and 1 appear more frequently in the output as compared to the value 2. If the mixed radix number generator process (described above in relation to FIG. 2) is employed with a fixed rotation offset of one (1), then the statistical artifacts are spread almost evenly over all equivalence classes of a Galois field GF[3]. A graph is provided in FIG. 3B that illustrates the results of the mixed radix number generator process of FIG. 2 as obtained from a MATLAB® simulation. The graph in FIG. 3B shows a uniform distribution of the elements 0, 1 and 2 in the output sequence.

Mixed Radix Number Generator Method

Referring now to FIG. 4, there is provided a flow diagram of a mixed radix number generator method 400 for spreading statistical artifacts evenly over all equivalence classes of a Galois field GF[F]. The flow diagram is an alternative expression of the concept which is shown in FIG. 2. As shown in FIG. 4, the method 400 begins with step 402 and continues with step 404. In step 404, a relatively large first Galois field GF[M] is selected. The relative sizes of M and P can take any value and retain the statistical properties described in this application. The value of M is typically chosen to be orders of magnitude larger than P, but that is not a requirement for the embodiment to function correctly. Step 404 also involves selecting a second Galois field GF[P] which is smaller than the first Galois field GF[M]. Step 404 further involves selecting the Galois field characteristic M to be mutually prime with respect to the Galois field characteristic P. The phrase "mutually prime" as used herein refers to two (2) or more integers having no common integer divisor except one (1).

After step 404, the method 400 continues with step 406. In step 406, a first random number sequence is generated utilizing a ring structure defined by the relatively large Galois field GF[M]. Still, the invention is not limited in this regard. For example, the first random number sequence can also be generated utilizing a ring structure defined by a punctured Galois field GF'[M]. As used herein, the term "punctured" means at least one element has been discarded in a Galois field GF[M] that exceed an integer multiple of a desired characteristic.

Referring again to FIG. 4, the first random number sequence includes the random numbers $RN_1, RN_2, \ldots, RN_N$. The random number sequence can be, but is not limited to, a pseudo-random number sequence or a pseudo-chaotic number sequence. In this regard, it should be understood that a random number generator (RNG) can be employed for generating a random number sequence on the relatively large Galois field GF[M] or a punctured Galois field GF'[M]. RNGs are well known to persons skilled in the art, and therefore will not be described in great detail herein. However, if should be understood that any RNG known in the art can be used without limitation.

Subsequently, the method 400 continues with step 408. Step 408 and a subsequent step 410 (described below) collectively provide a means for removing unwanted statistical artifacts in a mixed radix conversion. Step 408 and the subsequent step 410 (described below) also collectively provide a means for spreading statistical artifacts evenly over all equivalence classes of a Galois field GF[P]. This even distribution of statistical artifacts provides stochastic adherence to a desired statistical property, namely a uniform distribution of elements from the Galois field GF[M] over the Galois field GF[P]. Further, step 408 and the subsequent step 410 (described below) also collectively provide a means for inducing chosen statistical artifacts over the equivalence classed of a Galois field GF[P].

In step 408, arithmetic operations are performed to combine each random number $RN_1, RN_2, \ldots, RN_N$ of the first random number sequence with a result of a modulo P operation. P is the Galois field characteristic of a Galois field GF[P]. The modulo P operation utilizes a preceding random number $RN_1, RN_2, \ldots, RN_N$ of the first random number sequence. The arithmetic operations can be generally defined by the mathematical Equations (1) through (4).

$$RN_1' = RN_1 + 0 \quad (1)$$

$$RH_2' = RN_2 + RN_1' \text{ modulo } P \quad (2)$$

$$RN_3' = RN_3 + RN_2' \text{ modulo } P \quad (3)$$

$$\ldots$$

$$RN_N' = RN_N + RN_{N-1}' \text{ modulo } P \quad (4)$$

where $RN_1'$ is a modified first random number derived from a first arithmetic operation. $RN_2'$ is a modified second random number derived from a second arithmetic operation. $RN_3'$ is a modified third random number derived from a third arithmetic operation. $RN_N'$ is a modified $N^{th}$ random number derived from an $N^{th}$ arithmetic operation. $RN_{N-1}'$ is a second to last, modified random number derived from a second to last arithmetic operation. $RN_1$ is a first random number of the first random number sequence. $RN_2$ is a second random number of the first random number sequence. $RN_3$ is a third random number of the first random number sequence. $RN_N$ is a last random number of the first random number sequence. P is a modulus having a value selected to be a positive integer defining a finite field size of a Galois field GF[P].

An alternative embodiment of step 408 is to combine each random number $RN_1, RN_2, \ldots, RN_N$ of the first random number sequence with a result of a modulo P operation plus a fixed offset P is the Galois field characteristic of a Galois field GF[P]. The modulo P operation utilizes a preceding random number $RN_1, RN_2, \ldots, RN_N$ of the first random number sequence. The arithmetic operations can be generally defined by the mathematical Equations (5) through (8).

$$RN_1' = RN_1 + C \quad (5)$$

$$RN_2' = RN_2 + RN_1' + C \text{ modulo } P \quad (6)$$

$$RN_3' = RN_3 + RN_2' + C \text{ modulo } P \quad (7)$$

$$\ldots$$

$$RN_N' = RN_N + RN_{N-1}' + C \text{ modulo } P \quad (8)$$

where $RN_1'$ is a modified first random number derived from a first arithmetic operation. $RN_2'$ is a modified second random number derived from a second arithmetic operation. $RN_3'$ is a modified third random number derived from a third arithmetic operation. $RN_N'$ is a modified $N^{th}$ random number derived from an $N^{th}$ arithmetic operation. $RN_{N-1}'$ is a second to last modified random number derived from a second to last arithmetic operation. $RN_1$ is a first random number of the first random number sequence. $RN_2$ is a second random number of the first random number sequence. $RN_3$ is a third random number of the first random number sequence. $RN_N$ is a last random number of the first random number sequence. P is a modulus having a value selected to be a positive integer defining a finite field size of a Galois field GF[P]. C is an arbitrary constant chosen to rotate the effective output in a manner to eliminate any fixed points.

After step 408, the method 400 continues with step 410. It should be understood that step 410 is performed to generate a second random number sequence. This second random number sequence has evenly distributed statistical artifacts over all equivalence classes of the second Galois field GF[P]. Step 410 involves performing arithmetic operations utilizing the modified random numbers $RN_1', RN_2', RN_3', \ldots, RN_N'$ derived from the arithmetic operations performed in step 408.

These arithmetic operations can be defined by the mathematical Equations (9) through (12).

$$R_1 = RN_1' \text{ modulo } P \quad (9)$$

$$R_2 = RN_2' \text{ modulo } P \quad (10)$$

$$R_3 = RN_3' \text{ modulo } P \quad (11)$$

$$\ldots$$

$$R_N = RN_{N-1}' \text{ modulo } P \quad (12)$$

where $R_1$ is a result derived from a first arithmetic operation. $R_2$ is a result derived from a second arithmetic operation. $R_3$ is a result derived from a third arithmetic operation. $R_N$ is a result derived from a last arithmetic operation. $RN_1'$ is a modified first random number derived from a first arithmetic operation performed in step 408. $RN_2'$ is a modified second random number derived from a second arithmetic operation performed in step 408. $RN_3'$ is a modified third random number derived from a third arithmetic operation performed in step 408. $RN_N'$ is a modified $N^{th}$ random number derived from an $N^{th}$ arithmetic operation performed in step 408. P is a modulus having a value selected to be a positive integer defining a finite field size of a Galois field GF[P]. It should be understood that each of the results $R_1, R_2, \ldots, R_N$ is an element $\{0, 1, 2, \ldots, P-1\}$ from the Galois field GF[P]. It should be understood that the second random number sequence is defined by a set of random numbers, namely $R_1, R_2, \ldots, R_N$.

Referring again to FIG. 4, the method 400 continues with step 412, in step 412, the method 400 ends. It should be understood that the method 400 is one method for removing unwanted statistical artifacts in a conventional mixed radix conversion. However, the invention is not limited in this regard and any other mixed radix number generator method configured for spreading statistical artifacts evenly over all equivalence classes of a Galois field GF[P] can be used without limitation.

Method for Altering A Data Stream

Figure 5:
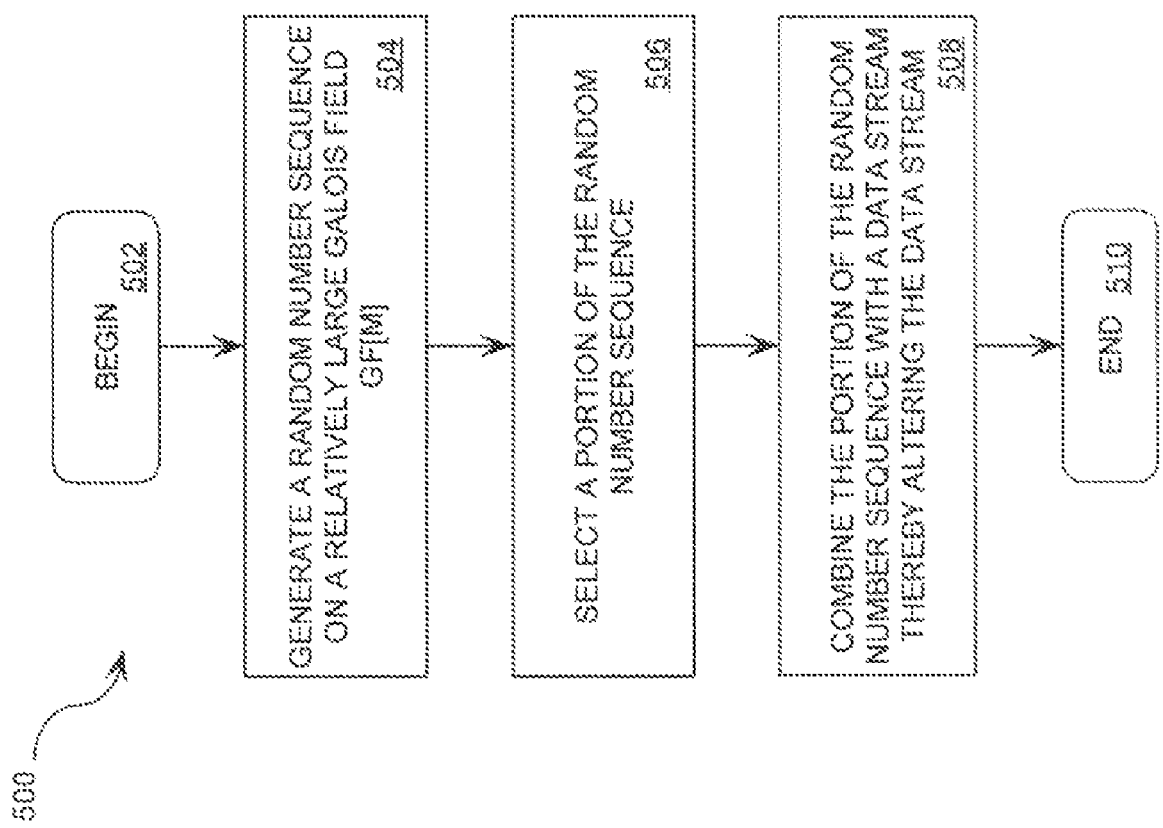
FIG. 5 is a flow diagram of a conventional method for altering a data stream that is useful for understanding the invention.
Figure 6:
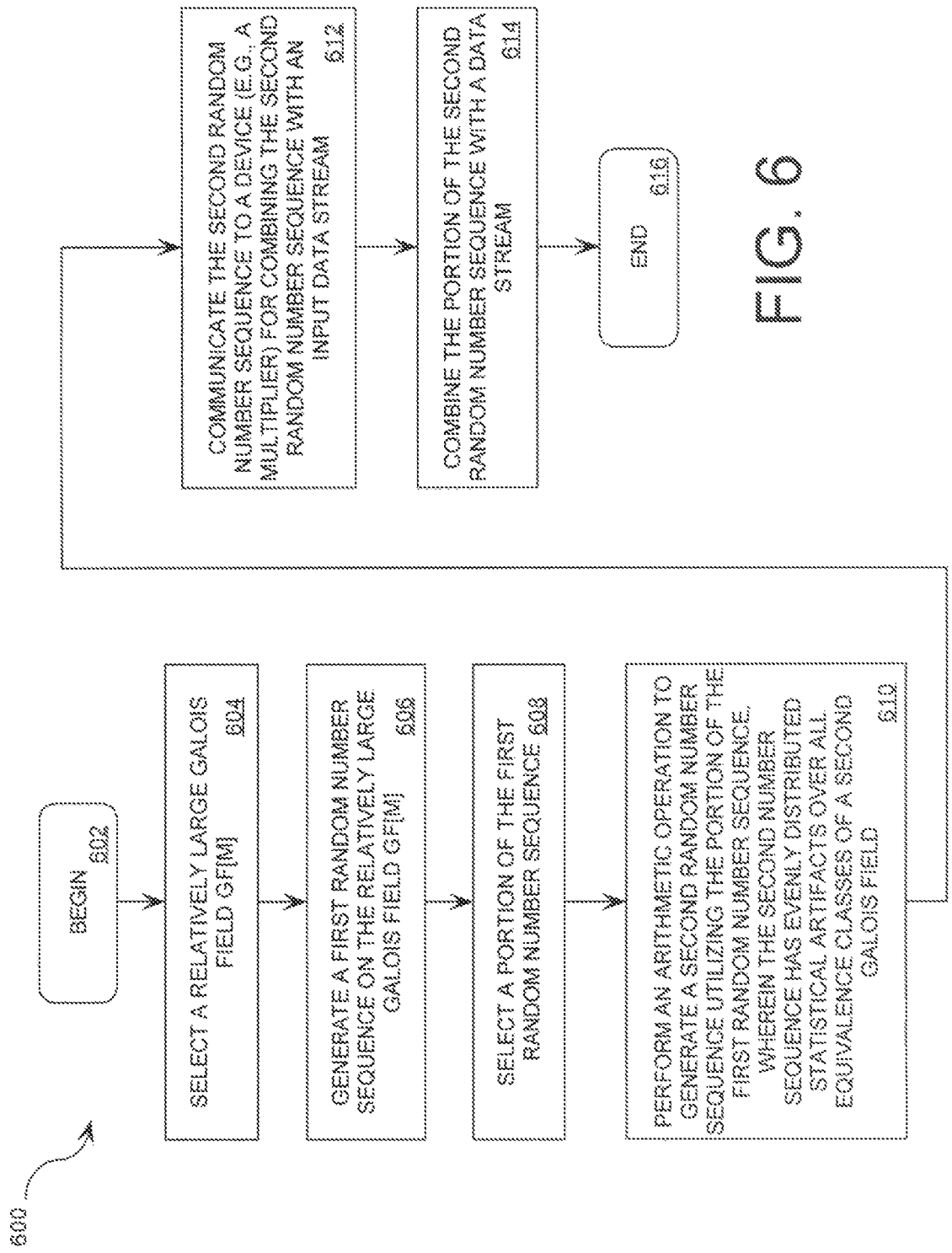
FIG. 6 is a flow diagram of a method for increasing the security of a communications system that is useful for understanding the invention.

Referring now to FIG. 5, there is provided a flow diagram of a conventional method 500 for altering a data stream that is useful for understanding the invention. As shown in FIG. 5, the method 500 begins with step 502 and continues with step 504. In step 504, a random number sequence is generated. It should be understood that the sequence of random numbers are contained within a relatively large Galois field GF[M]. After generating the random number sequence, step 506 is performed where a portion of the random number sequence is selected.

After step 506, the method 500 continues with step 508. In step 508, the portion of the random number sequence is combined with the input data stream thereby altering the input data stream. In this regard, it should be understood that the portion of the random number sequence has a size that is greater than or equal to that of the input data stream, i.e., when they are expressed in the same number base (or radix). As such, the method 500 can be modified accordingly. For example, the method 500 can include a conversion step prior to the step 508. The conversion step can involve converting the portion of the random number sequence from a size GF[M] to a size n if the input data stream is of a size GF[n] or GF[n/d], where d is an even divisor of n. Subsequently, step 510 is performed where the method 500 ends.

As should be understood, a relatively large Galois field GF[M] provides a certain degree of security to the conventional method 500. In this regard, it should be appreciated that the Galois field GF[M] is a field that contains only a finite number of elements $\{0, 1, 2, \ldots, M-1\}$. The Galois field GF[M] has a finite field size defined by the Galois characteristic M. As such, an output sequence can repeat every $M^{th}$ element. This repetitive behavior can produce correlations thereby making a decoding of an altered data stream relatively easy when M is small. Consequently, it is desirable to select a relatively large Galois field GF[M].

It should also be appreciated that selecting a portion of the random number sequence also provides a certain degree of security to the conventional method 500. For example, a random number sequence is generated on a Galois field GF[M]. In this example, it is assumed that the random number sequence contains five hundred (500) bits. A portion of the random number sequence is selected to include only sixteen (16) of the five hundred (500) bits. By using only sixteen (16) bits of the random number sequence to alter a data stream, it becomes more difficult to determine the Galois field GF[M] employed for generating the random number sequence. Still, it is desirable to further increase the security of the method.

Figure 8:
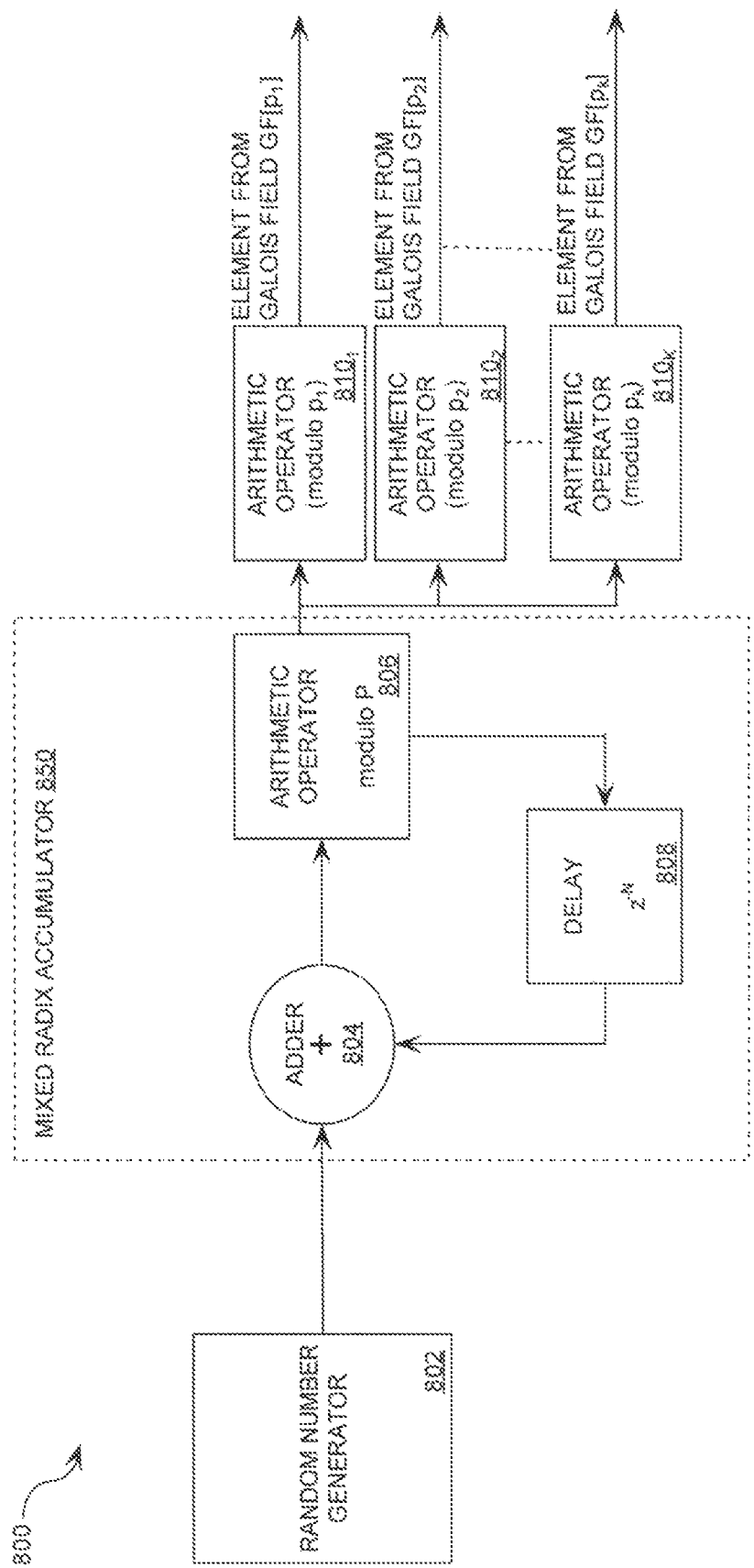
FIG. 8 is a block diagram of a mixed radix number generator that is useful for understanding the invention.

Referring now to FIG. 8, there is provided a method 600 for increasing a security of a communications system. As shown in FIG. 8, the method 600 begins with step 602 and continues with step 604. In step 604, a relatively large Galois field GF[M] is selected. As should be understood, a large Galois field can minimize the likelihood that an attacker of a communications system can determine the Galois field GF[M] employed for generating an original random number sequence from an altered data stream. In effect, the large Galois field GF[M] can provide a certain degree of security to a communications system implementing the method 600. Stated in an alternate fashion, the security of a random number sequence is largely defined by the dynamic range of the output value (number of bits or digits) and the apparent randomness.

Thereafter, step 606 is performed where a first random number sequence is generated utilizing a ring structure defined by the Galois field GF[M]. Still, the invention is not limited in this regard. For example, the first random number sequence can also be generated utilizing a ring structure defined by a punctured Galois field GF'[M]. Each random number of the sequence is defined by an element of the Galois field GF[M] or the punctured Galois field GF'[M]. In step 608, a portion of the first random number sequence is selected. This step provides a higher degree of security to a communications system implementing method 600. In this regard, if should be appreciated that it becomes more difficult to determine the Galois field GF[M] when only a portion of the random number sequence is used to alter an input data stream.

Step 610 also involves performing arithmetic operations to generate a second random number sequence. This second random number sequence has evenly distributed statistical artifacts over all equivalence classes of the second Galois field GF[P]. According to a preferred embodiment of the invention, these arithmetic operations can be the mixed radix number generator process described above in relation to FIG. 2. Still, it should be appreciated that the invention is not limited in this regard. Any other suitable technique can be used for this purpose.

Referring again to FIG. 8, the method 600 continues with step 612. In step 612, the second random number sequence is communicated to a device, such as a multiplier. The second random number sequence is combined with an input data stream to form an altered data stream. The input data stream is of a size GF(n) or GF(n/d), where d is an even divisor of n. In this regard, it should be understood that the second random number sequence and the input data stream have the same size, i.e., they are expressed in the same number base (or radix) and contain the same number of digits. Thereafter, step 616 is performed where the method 600 ends.

A person skilled in the art will appreciate that method 600 is one method for increasing a security of a communications system. However, the invention is not limited in this regard and any other method implementing the present invention can be used without limitation.

Hardware Implementation

There are a variety of ways to implement the method 400 (described above in relation to FIG. 4) for removing unwanted statistical artifacts in a conventional mixed radix conversion algorithm. For example, the mixed radix number generator method 400 can be implemented utilizing a mixed radix accumulator arrangement similar to the one shown in FIG. 2. The mixed radix number generator can be deployed in a communications system and/or a cryptographic system for altering a data stream. In such a scenario, the mixed radix number generator can provide an increased security feature to the communications system and/or cryptographic system. Such a mixed radix number generator is described below in relation to FIG. 7.

Figure 7:
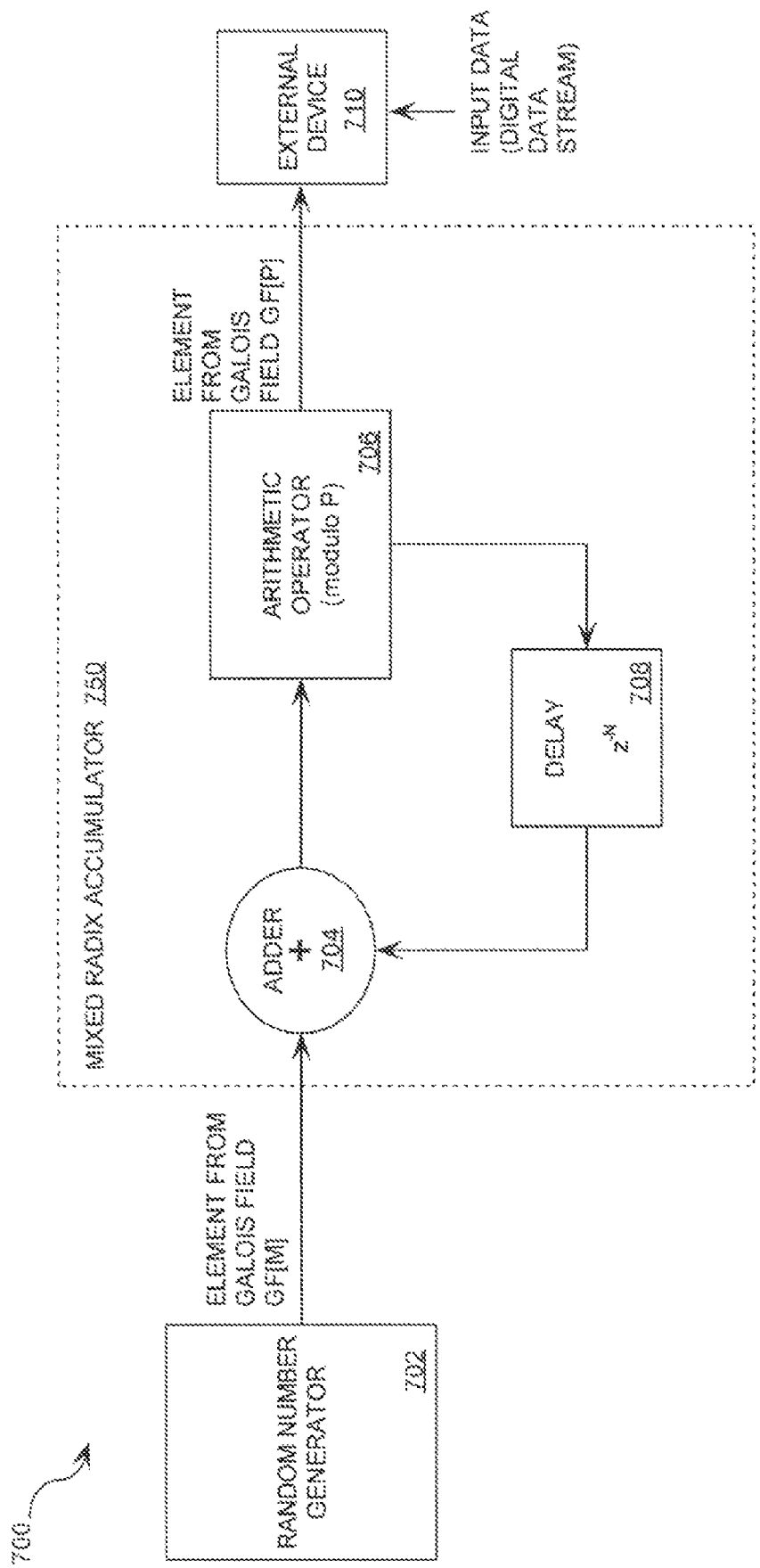
FIG. 7 is a block diagram of a mixed radix number generator connected to a mechanism for combining a generator output with a data steam that is useful for understanding the invention.

Referring now to FIG. 7, there is provided a block diagram of a mixed radix number generator 700. The mixed radix number generator 700 is comprised of a random number generator 702, a mixed radix accumulator 750, and an external device 710. The random number generator 702 can be, but is not limited to, a ring generator, a punctured ring generator, or a chaos generator. If the random number generator 702 is a ring generator, then the random number generator 702 is comprised of hardware and/or software configured to generate a random number sequence utilizing a ring structure defined by a Galois field GF[M]. If the random number generator is a punctured ring generator, then the random number generator 702 is comprised of hardware and/or software configured to generate a random number sequence utilizing a ring structure defined by a punctured Galois field GF'[M]. Accordingly, the output of the random number generator 702 can be a random element from the Galois field GF[M] or a random element from the punctured Galois field GF'[M]. In order to map an element from the Galois field GF[M] or the punctured Galois field GF'[M] to a desired Galois field characteristic P, the Galois field characteristic M is selected to be relatively prime to the Galois field characteristic P. Also, the Galois field characteristic M is selected to be greater than the Galois field characteristic P.

The random number generator 702 is also comprised of hardware and/or software configured to communicate a random number of a random number sequence to the mixed radix accumulator 750. The mixed radix accumulator 750 is configured to perform an arithmetic operation to generate a second random number. The arithmetic operation involves computing a remainder value utilizing the random number received from the random number generator 702. Accordingly, the mixed radix accumulator 750 is comprised of an adder 704, an arithmetic operator 706, and a delay 708.

The adder 704 is comprised of hardware and/or software configured to receive a random number from the random number generator 702 and a time delayed remainder from the delay 708 (described below). The adder 704 is also comprised of hardware and/or software configured to perform an addition operation using the random number received from the random number generator 702 and the time delayed remainder received from the delay 708 (described below). The adder 704 is also comprised of hardware and/or software configured to communicate the sum of the addition operation to the arithmetic operator 706.

The arithmetic operator 706 is comprised of hardware and/or software configured to perform arithmetic operations. The arithmetic operations can involve performing modulo operations. Modulo operations are well known to those skilled in the art, and therefore will not be described in great detail herein. However, it should be appreciated that modulo operations can generally be defined by a mathematical equation: R=S modulo P, where R is a remainder derived from a modulo operation, S is a random number input to the arithmetic operator 706. P is a modulus having a value selected to be a positive integer defining a finite field size of a Galois field GF[F], it should be understood that the remainder R is an element from the Galois field GF[P].

The arithmetic operator 706 is further comprised of hardware and/or software configured to communicate the remainder R to the external device 710 and the delay 708. The external device 710 can be a combiner configured for combing the remainder with input data or a digital data stream. For example, the external device is a multiplier in one embodiment of the invention. The delay 708 is comprised of hardware and software configured to delay the remainder R received from the arithmetic operator 708 by $z^{-N}$ or N clock cycles, where $z^{-1}$ is a one (1) sample clock period delay or unit delay and N is a positive integer value. $z^{-N}$ is a N clock period delay. For example, the delay 708 is configured to delay the remainder R by one (1) clock cycle. Still, the invention is not limited in this regard.

A person skilled in the art will appreciate that the mixed radix generator 700 is one architecture of a mixed radix generator implementing the present invention. However, the invention is not limited in this regard and any other mixed radix generator architecture implementing the present invention can be used without limitation.

It should be understood that the method and system for a mixed radix number generator described in relation to FIGS. 1-7 is not limited with regard to the size or composition of the number P. For example, P can be selected so that P is equal to the product of $p_1^x p_2^x, \ldots, {}^x p_k$, where all of the k factors are mutually prime with respect to M and each other. This characteristic of the system can facilitate certain alternative embodiments which provide for k individual outputs, each of which can offer similar statistical behavior as compared to the system described above in reference to FIGS. 1-7. Such a mixed radix generator is provided in FIG. 8.

A Mixed Radix Accumulator with Multiple Outputs

Referring now to FIG. 8, there is provided a block diagram of an alternative embodiment: of a mixed radix number generator 800 which provides multiple outputs. The mixed radix number generator 800 is comprised of a random number generator 802 and a mixed radix accumulator 850. The random number generator 802 can be, but is not limited to, a ring generator, a punctured ring generator, or a chaos generator. If the random number generator 802 is a ring generator, then the random number generator 802 is comprised of hardware and/or software configured to generate a random number sequence utilizing a ring structure defined by a Galois field GF[M]. If the random number generator is a punctured ring generator, then the random number generator 802 is comprised of hardware and/or software configured to generate a random number sequence utilizing a ring structure defined by a punctured Galois field GF'[M]. Accordingly, the output of the random number generator 802 can be a random element from a Galois field GF[M] or a random element from a punctured Galois field GF'[M].

In order to map an element from the Galois field GF[M] or the punctured Galois field GF'[M] to a desired Galois field characteristic P, the Galois field characteristic M is selected to be relatively prime to the Galois field characteristic P, where P is equal to the product of $p_1^{x_1} p_2^{x_1}, \ldots, {}' p_k$. The Galois field characteristic M is also selected to be mutually prime with the factors $p_1^{x_1} p_2', \ldots, {}' p_k$ of the Galois field characteristic P. The Galois field characteristic M is further selected to be greater than the Galois field characteristic P.

The random number generator 802 is also comprised of hardware and/or software configured to communicate random numbers of a random number sequence to the mixed radix accumulator 850. The mixed radix accumulator 860 advantageously has a configuration which is similar to the mixed radix accumulator 750 and performs similar functions. In this regard, the mixed radix accumulator is configured to perform an arithmetic operation to generate a second random number. The arithmetic operation involves computing a remainder value utilizing the random number received from the random number generator 802. Accordingly, the mixed radix accumulator 850 is also comprised of an adder 804, and a delay SOB.

The random number generator 802 also includes a plurality of arithmetic operators $810_1$, $810_2$, . . . $810_k$. Each of the arithmetic operators $810_1$, $810_2$, . . . $810_k$ is comprised of hardware and/or software configured to perform arithmetic operations. The arithmetic operations can involve performing modulo operations. According to a preferred embodiment, the modulo operations are defined by the mathematical equation R modulo p, where R is a remainder derived from a modulo operation performed at the arithmetic operator 806, and p is one of the factors $p_1, p_2, \ldots, {}'p_k$ of the Galois field characteristic P. Each of the arithmetic operators $810_1$, $810_2, \ldots 810_k$ is also comprised of hardware and/or software configured to produce one of k outputs. Each of the arithmetic operators $810_1$, $810_2$, . . . $810_k$ provides as an output an element of a Galois field $GF[p_{1-k}]$ which can be forwarded to an external device (not shown). The external device can be any device configured for combing the remainder with input data. For example, in one embodiment the external device is a multiplier. Most significantly, each sequence provided as one of the k outputs from arithmetic operators $810_1$, $810_2, \ldots 810_k$ will have uniformly distributed outputs which are free of unwanted statistical artifacts.

A person skilled in the art will appreciate that the mixed radix generator 800 is one architecture of a mixed radix number generator implementing the present invention. However, the invention is not limited in this regard and any other mixed radix generator architecture implementing the present invention can be used without limitation. According to one such embodiment, the delay 808 can be replaced with a finite impulse response (FIR) or an infinite impulse response (IIR) filter, where all operations are performed using modified GF arithmetic.

Multi-Rate Implementation of Mixed Radix Number Generator

Figure 9:
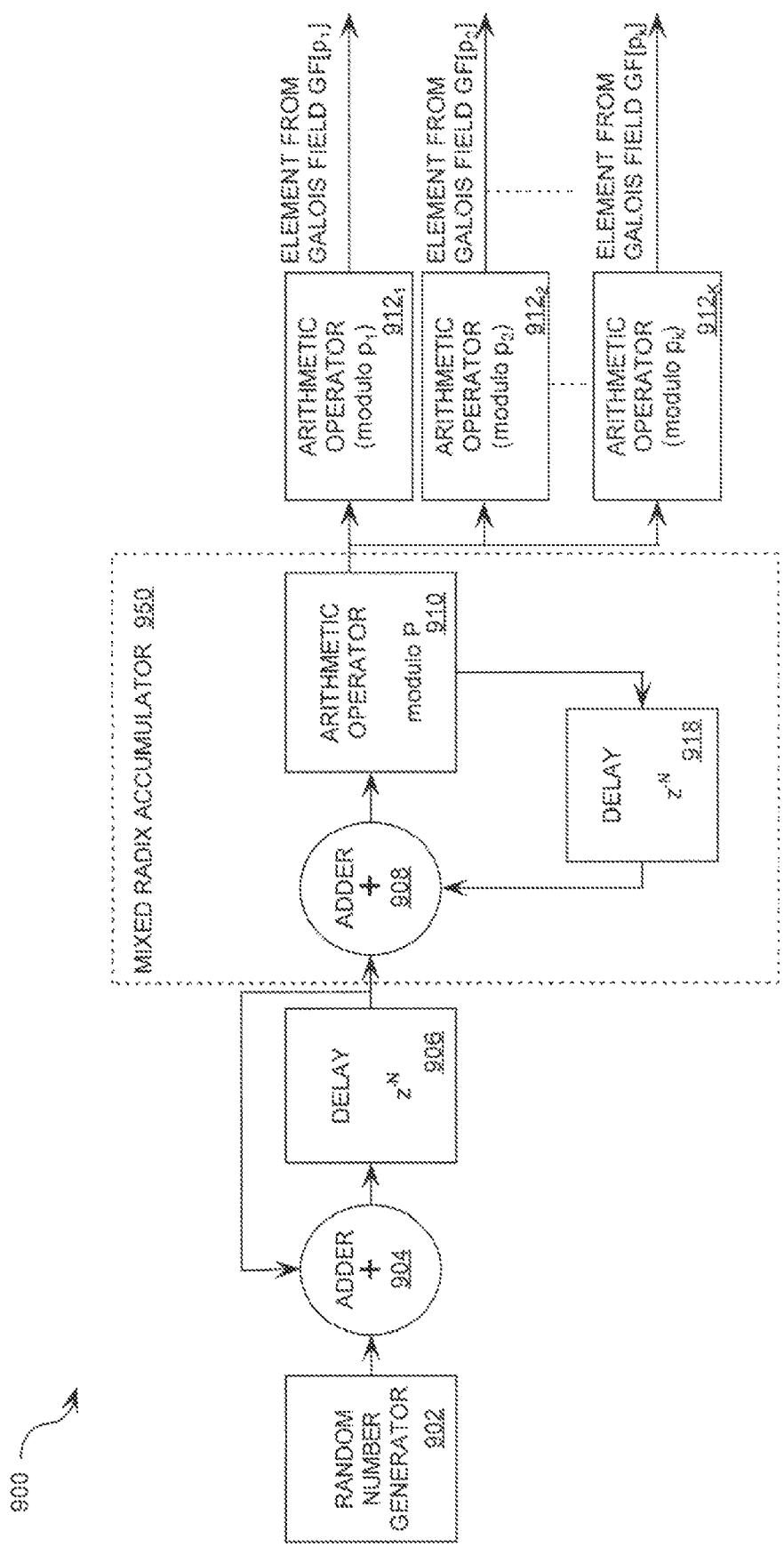
FIG. 9 is a block diagram of a mixed radix number generator that is useful for understanding the invention.

Referring now to FIG. 9, there is provided a second alternative embodiment of the invention. The second alternative embodiment is a multi-rate implementation of a mixed radix number generator 900. The multi-rate implementation can involve either periodically sampling the output from a random number generator or sampling such output at a higher rate as compared to the set of desired outputs. Once again, this leads to an accumulation of values that cannot easily be reconstructed by an observer.

As illustrated in FIG. 9, the mixed radix generator 900 is comprised of a random number generator 902 and a mixed radix accumulator 950. The random number generator 902 and the mixed radix accumulator 950 are similar to the corresponding structures 802, 850 described above in relation to FIG. 8. Accordingly, the mixed radix accumulator 950 can also be comprised of adder 908 and delay 918. A set of arithmetic operator units $912_1, 912_2, \ldots 912_k$ can also be provided for performing operations similar to those arithmetic operator units $810_1, 810_2, \ldots 810_k$ in FIG. 8. Multi-rate processing is well understood by those skilled in the art, and therefore will not be described in great detail herein.

The mixed radix generator 900 also includes adder 904 and delay 906. The adder 004 is comprised of hardware and/or software configured to receive a random number from the random number generator 902 and a time delayed output from the delay 906 (described below). The adder 904 is also comprised of hardware and/or software configured to perform an addition operation using the random number received from the random number generator 902 and the time delayed output received from the delay 906. The adder 904 is also comprised of hardware and/or software configured to communicate the sum of the addition operation to the delay 906.

The delay 906 is comprised of hardware and software configured to delay the sum received from the adder 904 by N clock cycles. Still, the invention is not limited in this regard. The delay 906 is also comprised of hardware an software configured to communicate a time delayed output (i.e., a time delayed sum) to the adders 904, 908.

A person skilled in the art will appreciate that the mixed radix generator 900 is one architecture of a mixed radix generator implementing the present invention. However, the invention is not limited in this regard and any other mixed radix generator architecture implementing the present invention can be used without limitation.

In light of the foregoing description of the invention, it should be recognized that the present invention can be realized in hardware, software, or a combination of hardware and software. A method of generating an arbitrary permutation ordering of bits according to the present invention can be realized in a centralized fashion in one processing system, or in a distributed fashion where different elements are spread across several interconnected processing systems. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or an FPGA could also be used to achieve a similar result.

The present invention can also be embedded in a computer program product which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Additionally, the description above is intended by way of example only and is not intended to limit the present invention in any way, except as set forth in the following claims.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fail within the scope of the appended claims.

We claim:

1. A method for masking a process used in generating a number sequence, comprising;
    generating, by at least one electronic circuit, a first sequence of numbers contained within a Galois field GF[M];
    performing, by said electronic circuit, a first modification to a first number in said first sequence of numbers to obtain a modified first number, said first modification comprising summing said first number with a result of a modulo P operation performed on a second number of said first sequence that precedes said first number, where M is relatively prime with respect to P;
    subsequent to said first modification, performing, by said electronic circuit, a second modification to said modified first number comprising a modulo P operation;
    repeating, by said electronic circuit, said first and second modifications for a plurality of numbers comprising said first sequence of numbers to generate a second sequence of numbers; and
    combining, by said electronic circuit, at least a portion of said second sequence of numbers with a sequence of symbols defining information to be stored in a storage device or transmitted over a communications link.

2. The method according to claim 1, wherein said generating step further comprises generating a pseudo-random sequence of numbers containing chosen statistical artifacts relating to said generating step, and wherein said statistical artifacts are chosen to create a uniformly distributed sequence of random numbers on GF[P] by said first and second modification steps.

3. The method according to claim 1, wherein said generating step further comprises exhaustively producing said first sequence of numbers by using a mapping which is periodically repeated.

4. The method according to claim 3, wherein said mapping includes a combination of an additive mapping and a multiplicative mapping.

5. The method according to claim 4, wherein said additive mapping and said multiplicative mapping in combination are selected to include repeated computations of an irreducible polynomial over a Galois field GF[M].

6. The method according to claim 1, wherein M is a value that is larger than P.

7. The method according to claim 1, wherein M is a value that is mutually prime with P and all of a plurality of prime factors of P include including $p_1, p_2, p_3, \ldots p_k$.

8. The method according to claim 7, further comprising performing, by said electronic circuit, a third modification step on said second sequence of numbers, said third modification step comprising generating a plurality of output number sequences from said second sequence of numbers.

9. The method according to claim 8, wherein said third modification step comprises a modulo p operation performed upon each number in said second sequence of numbers to generate said plurality of output number sequences, where p includes a plurality of values selected from the group comprising $p_1, p_2, p_3 \ldots p_k$.

10. The method according to claim 1, wherein said second number is immediately preceding said first number.

11. The method according to claim 1, wherein said second number precedes said first number by N positions, where N is greater than 1.

12. The method according to claim 1, wherein said second sequence of numbers has statistical artifacts that are evenly distributed over a plurality of equivalence classes of said Galois field GF[P], and said plurality of equivalence classes include an equivalence class for each integer $0, 1, \ldots, P-1$.

13. A mixed radix number generator, comprising:
a number generator configured for generating a first sequence of numbers contained within a Galois field GF[M];
a mixed radix accumulator configured for
(1) performing a first modification to a first number in said first sequence of numbers to obtain a modified first number, said first modification comprising summing said first number with a result of a modulo P operation performed on a second number of said first sequence of numbers that precedes said first number, where M is relatively prime with respect to P,
(2) subsequent to said first modification, performing a second modification to said modified first number comprising a modulo P operation, and
(3) repeating said first and second modifications for a plurality of numbers comprising said first sequence of numbers to generate a second sequence of numbers.

14. The system according to claim 13, further comprising means configured for using said second sequence of numbers to modify a digital data stream.

15. The system according to claim 13, wherein said number generator comprises a pseudo-random number generator for generating a pseudo-random sequence of numbers containing statistical artifacts relating to said generation of said first sequence of numbers, and wherein said statistical artifact is eliminated by said mixed radix accumulator.

16. The system according to claim 13, wherein said number generator is configured for exhaustively producing said first sequence of numbers by using a mapping which is periodically repeated.

17. The system according to claim 16, wherein said mapping includes a combination of an additive mapping and a multiplicative mapping.

18. The system according to claim 17, wherein said additive mapping and said multiplicative mapping in combination include repeated computations of an irreducible polynomial over a Galois field GF[M].

19. The system according to claim 13, wherein M is larger than P.

20. The system according to claim 13, further wherein a value of M is mutually prime with respect to a value of P and all of a plurality of prime factors of P including $p_1, p_2, p_3, \ldots p_k$.

21. The system according to claim 20, further comprising a plurality of arithmetic operator units each configured for performing a third modification on said second sequence of numbers, said plurality of arithmetic operator units generating a plurality of output number sequences from said second sequence of numbers.

22. The system according to claim 21, wherein said third modification comprises a modulo p operation performed upon each number in said second sequence of numbers to generate said plurality of output number sequences, where p includes a plurality of values selected from the group comprising $p_1, p_2; p_3, \ldots p_k$.

23. The system according to claim 13, wherein said second number precedes said first number by one position.

24. The system according to claim 13, wherein said second number precedes said first number by N positions, where N is greater than 1.

25. The system according to claim 13, wherein said first sequence of numbers is limited to a finite number of elements M defined by a Galois field GF[M], said second sequence of numbers has statistical artifacts that are evenly distributed over a plurality of equivalence classes of said Galois field GF[P], and wherein said plurality of equivalence classes include an equivalence class for each integer $0, 1, \ldots, P-1$.

26. The system according to claim 13, wherein said first sequence is operated upon by a filter structure configured to perform calculations inside a Galois of equal size to the second sequence.

* * * * *